Nov. 6, 1928.
J. F. HAWKINS
LAWN MOWER
Filed Feb. 5, 1926
2 Sheets-Sheet 1
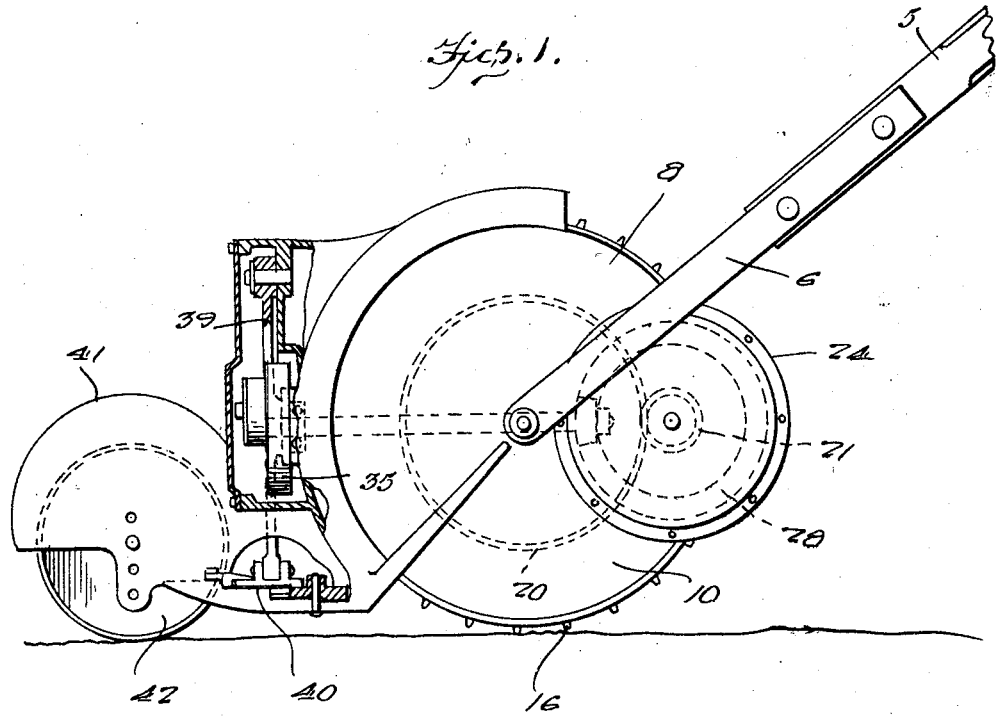
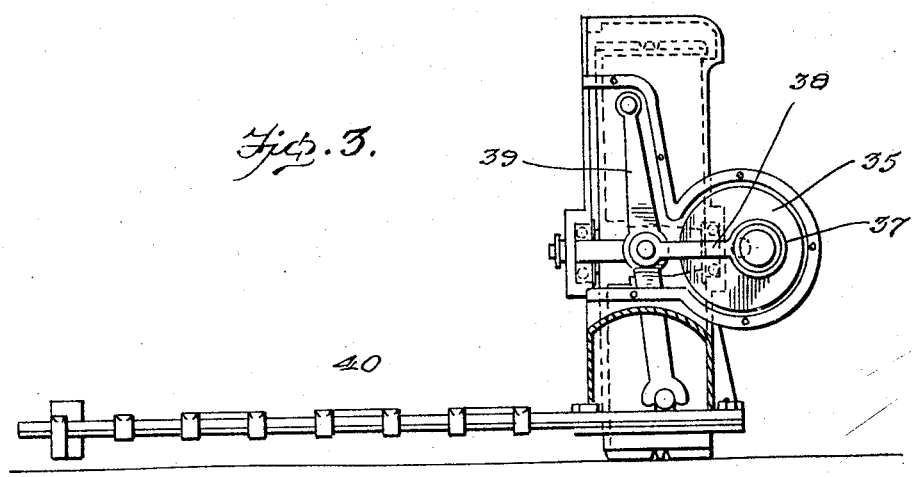
Inventor
J. F. Hawkins
By Clarence A. O'Brien
Attorney

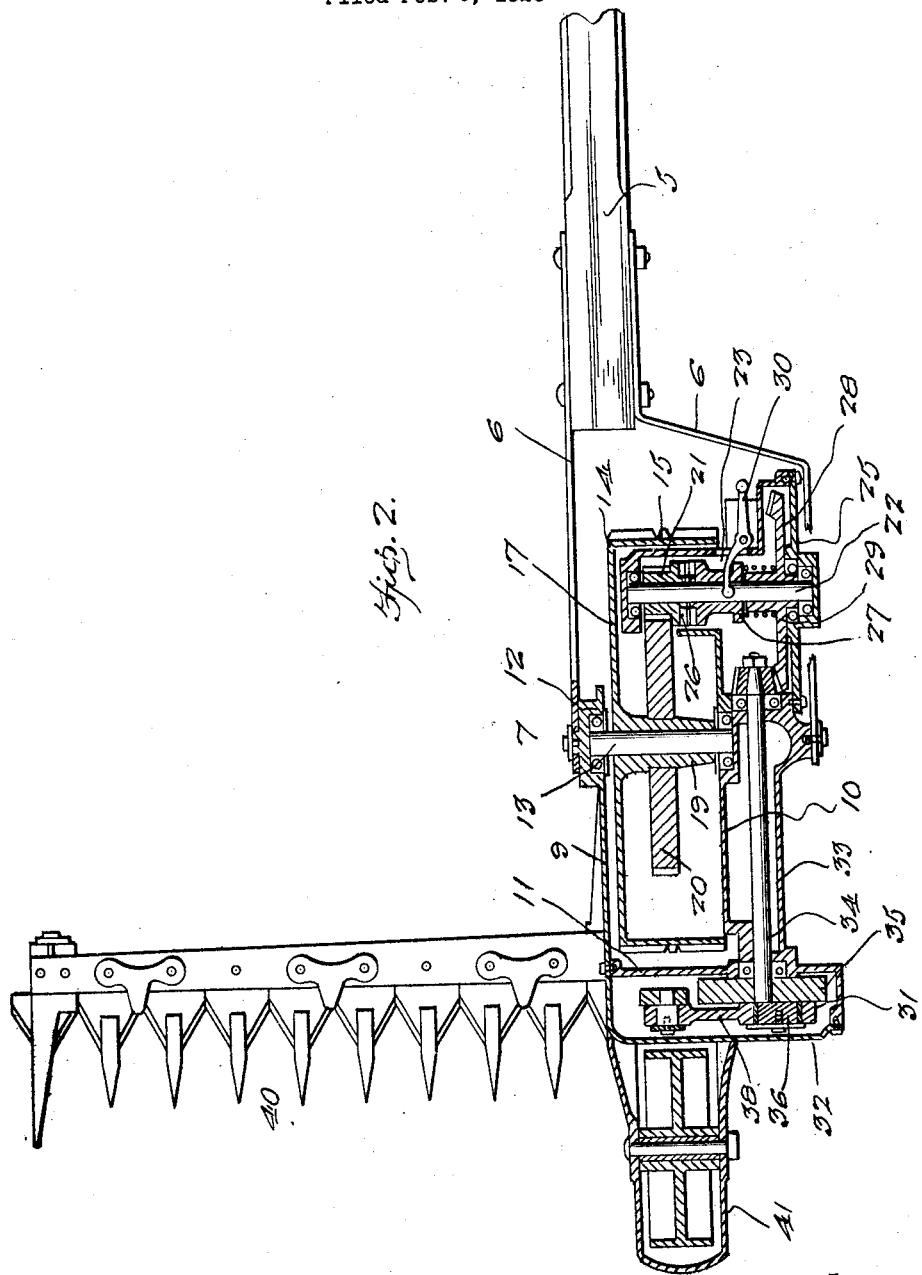

Patented Nov. 6, 1928.

1,690,899

UNITED STATES PATENT OFFICE.

JOHN FRED HAWKINS, OF PAWHUSKA, OKLAHOMA.

LAWN MOWER.

Application filed February 5, 1926. Serial No. 86,210.

This invention relates to lawn mowers of the hand power type, and has for its primary object to provide traction operated means whereby a grass cutting mechanism similar to the well known sickle unit employed in mowing machines may be advantageously operated for thus permitting a relatively wide swath to be cut during operation of the device.

A further object is to provide such a lawn mower wherein all of the sickle bar operating units such as gears, shafts, and the like are enclosed within a casing construction for thus preventing the clogging of the same by the cut grass.

A further and important object is to provide traction controlled operating mechanism for the sickle bar that is so constructed as to cause the rapid reciprocation of the cutter bar even though the device is moving slowly over the surface of the ground, and this without requiring great energy on the part of the operator.

A still further object resides in the provision of such traction controlled sickle bar operating mechanism that may be readily disassembled for repair or renewal purposes.

Other objects will become apparent as the nature of the invention is better understood, the same comprises the novel form, combination and arrangement of parts hereinafter more fully described, shown in the accompanying drawings and claimed.

In the drawings wherein like reference characters indicate corresponding parts throughout the several views:

Figure 1 is a view partly in elevation and partly in section of my improved lawn mower.

Figure 2 is a horizontal section thereof for more clearly disclosing the traction controlled sickle bar operating mechanism, and Figure 3 is a section taken through the front end of the machine for more clearly disclosing the cutter bar actuating mechanism per se, its casing cover having been removed.

Now having particular reference to the drawings, my novel lawn mower has a handle 5 pivotally connected at its lower end through the medium of a pair of metallic bars 6—6 to a gear and shaft casing designated generally 7.

Said casing 7 includes a main circular housing 8, consisting of spaced side walls 9 and 10 that are interconnected at the forward and upper edges thereof by segmental walls 11.

Journaled in ball bearings within receiving pockets 12 upon the inner faces of said casing walls 9 and 10 is a cross shaft 13 to which is keyed a ground engaging traction wheel 14 of metallic formation including a rim 15 having traction lugs 16 thereon and one side wall 17 in slightly spaced relation to the inner adjacent wall 9 of the circular portion 8 of said casing 7. Furthermore, said traction wheel includes a central bearing sleeve 19 fixed to said shaft 13 and of a length slightly less than the length of said shaft as clearly shown in Figure 2 in order that there will be no tendency for the traction wheel to get out of true alignment with respect to the shaft, said sleeve obviously providing a relatively wide bearing surface therefor.

Fixed to the traction wheel sleeve 19 is a relatively large gear 20, the teeth of which mesh with a greatly reduced gear 21 fixed to the adjacent end of a transverse shaft 22 journaled at its opposite ends within bearings provided within the inner and outer walls of a subcasing 23 formed partly by the outer side wall 10 of the main circular portion 8 of the casing 7 and partly by a circular formation 24 at the rear of the main portion of said casing 7. Said subcasing is provided with a removable outer wall 25 in order that access may be had thereinto. By referring to Figure 2 it will be noted that the inner end of the subcasing 23 extends within the rim of the traction wheel 14 preventing the passage of the cut grass to said subcasing and thus impairing the efficient operation of the same.

The gear 21 is loose upon said shaft 22 and one face thereof is provided with clutch teeth 26 while splined upon the shaft outwardly of this gear is a clutch teeth carrying collar 27 outwardly of which and keyed to the shaft 22 is a large bevel ring gear 28 between which and said clutch collar 27 is an expansible spring 29 for normally maintaining the teeth of the collar in engagement with the teeth of the gear 21. Suitable hand controlled means 30 is provided for disengaging the collar from the gear against the action of said coil spring.

Formed upon the front side of the main circular portion 8 of the casing 7 is a further subcasing 31 open at its front side and equipped with a removable front wall 32 for permitting access to the casing and the elements arranged therein. A horizontal shaft housing 33 extends between subcasings 31 and 23 and has rotatable therein a horizontal shaft 34, the rearmost end of which carries a bevelled pinion in mesh with the teeth of the ring gear 28 upon the transverse shaft 22.

Within the subhousing 31 the shaft 34 is equipped with a fly wheel 35 that has eccentrically mounted upon its front face a circular member 36 rotatably mounted within and opening in one end 37 of a connecting link 38 that is pivoted at its opposite end to a rocking lever 39 pivoted at its upper end within the subhousing 31 and that is secured in a conventional manner at its lower end to the cutter member of a conventional type of sickle bar 40 mounted upon the casing 7 at the front end thereof as more clearly shown in Figures 1 and 3.

Formed integrally with the casing 7 beneath the subhousing 31 is a wheel guard 41 within which is vertically adjustably mounted a supporting wheel 42 to the front of the sickle bar.

It will be obvious that during the movement of the machine over the ground the wheel 14 will be caused to rotate, causing the rapid rotation of the horizontal shaft 34 by reason of the high speed gearing between said shaft and the traction wheel and the consequent rapid rocking of the arm 39 that controls the operation of the cutter bar of the sickle unit 40 resulting in the efficient cutting of grass regardless of its height.

The detailed operation will be apparent to those skilled in the art, and even though I have herein shown and described the invention as comprising certain particular structural elements, it is nevertheless to be understood that minor changes may be made therein without affecting the spirit and scope of the appended claim.

Having thus described the invention, what I claim as new and desire to secure by Letters Patent is:—

In a lawn mower of the character described, a gear casing comprising a central housing, a sub-housing at the rear of the central housing, and a front housing forwardly of the central housing, a traction wheel mounted within the central housing and projecting therethrough at the lower side for contact with the ground, and comprising a peripheral rim into which the subhousing extends, a gear carried by the traction wheel within the rim thereof, a transverse shaft mounted within said sub-housing, a gear upon one end of this shaft in mesh with the first mentioned gear, a gear upon the opposite end of said shaft, a horizontal shaft housing upon one side of the central housing and forming part of the gear casing, a horizontal shaft within said horizontal shaft housing, a gear upon the rear end of the shaft in mesh with the gear upon the last mentioned end of the shaft within said sub-housing, a sickle bar unit mounted upon the front end of the gear casing, and driving connections between the front end of the horizontal shaft and the cutter bar of said sickle unit.

In testimony whereof I affix my signature.

JOHN FRED HAWKINS.